H. N. HARRINGTON.
SHADE FOR HOP-BOXES.
No. 175,084. Patented March 21, 1876.
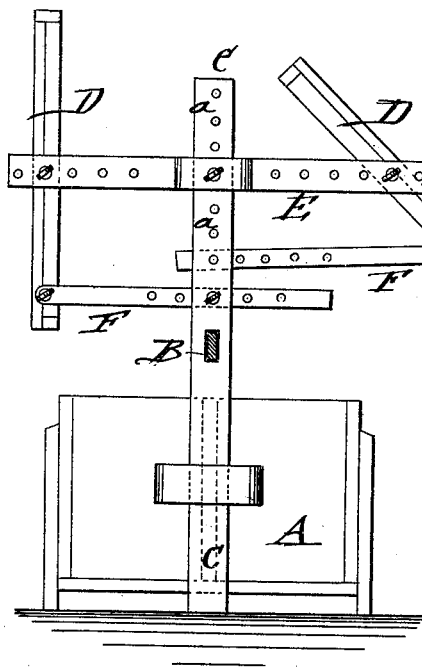
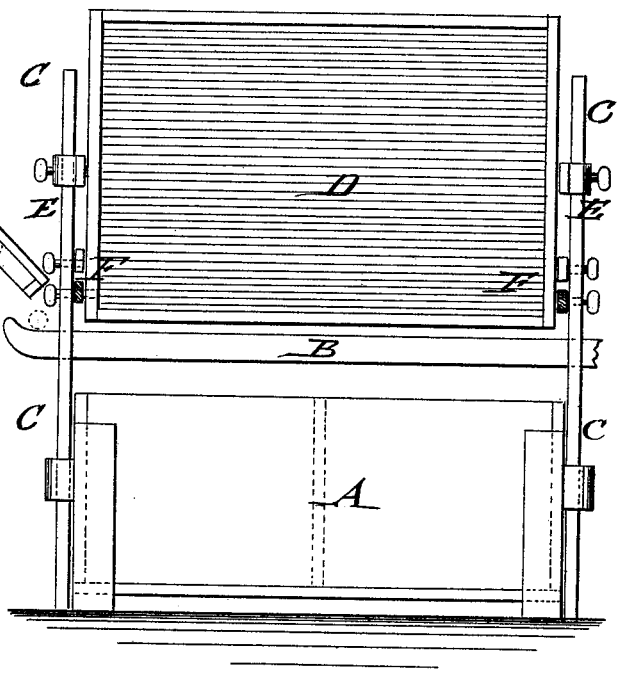
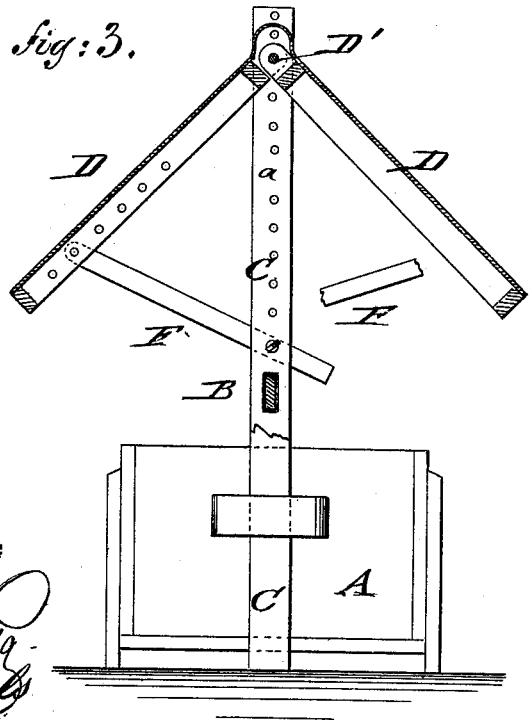

UNITED STATES PATENT OFFICE.

HIRAM NILES HARRINGTON, OF WILSON PLACE, NEW YORK.

IMPROVEMENT IN SHADES FOR HOP-BOXES.

Specification forming part of Letters Patent No. 175,084, dated March 21, 1876; application filed February 5, 1876.

*To all whom it may concern:*

Be it known that I, HIRAM NILES HARRINGTON, of Wilson Place, in the county of Madison and State of New York, have invented a new and Improved Shade for Hop-Boxes, of which the following is a specification:

In the accompanying drawing, Figure 1 represents an end view, Fig. 2 a side elevation, and Fig. 3 a vertical transverse section, of my improved shade attachment for hop-boxes, showing different positions and modifications of the same.

Similar letters of reference indicate corresponding parts.

The object of my invention is to so improve the hop-boxes which are used in picking the hops from the poles that not only the pickers are completely protected against the sun or rain, but also the hops sheltered against rotting, wilting, or other injurious influences of the weather. The invention consists of the connection of the hop-box by upright standards with adjustable shades, supported and braced so that the hops and pickers are protected against sun, rain, and wind.

In the drawing, A represents a hop-box of the customary construction, which is usually divided by four partitions into smaller boxes, with a picker sitting at each box. A longitudinal pole, B, secured above the boxes, serves as a support or rest for the hop-poles, which are with the vines placed thereon and moved gradually over the same to the picker to gather the hops therefrom. Vertical standards C of suitable height are secured at the ends of the hop-box, in suitable sockets or otherwise, supporting the longitudinal rest-pole C above the boxes, and at the upper ends adjustable shades D made of a suitable frame with canvas, oil-cloth, or other suitable material stretched and tacked thereon. The shades D are of sufficient size to protect the hop-box and the pickers fully against sun and rain, and are connected to the standards either by being hinged to a longitudinal rod, D', passing through perforations of the standards, as shown in Fig. 3, or by being attached to horizontal arms E, (shown in Figs. 1 and 2,) which are firmly clamped at any desired height to the perforated standards C. The lower part of the shades is applied by perforated brace-pieces F and fastening-pins to the standards, admitting thereby the adjustment of the shades in any position, angle, or height, to produce a complete and readily-adjusted protection for the pickers. By adjusting the shades in vertical position they serve as guards against the wind.

As the hops have to be picked within a short time after the gathering of the poles, and as they need to be protected, especially in drizzly, warm weather, to prevent the injury of the crop by rotting, or wilting in the sun, it is of the utmost importance to hop-growers to provide a protection to the hops in picking as well as to the pickers, to make them suffer less from the influence of the hot sun, and prevent any interruption of their work in rainy weather. This is avoided by my readily stored and easily transported shade attachment to the hop-boxes, which can be applied and taken off in a moment, and set during work to the position required by the exigencies of the weather.

Having thus described my invention, I claim as new and desire to secure by Letters Patent—

1. The combination, with a hop-box, of adjustable and braced shades, supported on vertical standards of the box, substantially in the manner and for the purpose set forth.

2. The combination of the upright standards, perforated horizontal arms, adjustable shades, and pivoted brace-pieces, to admit the setting of the shades against sun, rain, and wind, substantially as set forth and described.

HIRAM NILES HARRINGTON.

Witnesses:
    H. TOWNSEND HARRINGTON,
    FREDRICK THOMAS.